(12) United States Patent
Simms et al.

(10) Patent No.: US 11,429,917 B2
(45) Date of Patent: Aug. 30, 2022

(54) SYSTEM AND METHOD FOR ROBOTIC DELIVERY

(71) Applicant: HOME VALET, INC., Vienna, VA (US)

(72) Inventors: John Simms, Mclean, VA (US); Noel Simms, Jackson, MS (US); John Simms, Jr., Arlington, VA (US)

(73) Assignee: HOME VALET, INC., Vienna, VA (US)

(*) Notice: Subject to any disclaimer, the term of this patent is extended or adjusted under 35 U.S.C. 154(b) by 1432 days.

(21) Appl. No.: 15/584,053

(22) Filed: May 2, 2017

(65) Prior Publication Data

US 2018/0068253 A1 Mar. 8, 2018

Related U.S. Application Data

(60) Provisional application No. 62/382,926, filed on Sep. 2, 2016.

(51) Int. Cl.
*G06Q 10/08* (2012.01)
*G06Q 10/10* (2012.01)
*G05D 1/02* (2020.01)
*G06Q 30/06* (2012.01)

(52) U.S. Cl.
CPC ......... *G06Q 10/083* (2013.01); *G05D 1/0276* (2013.01); *G05D 1/0278* (2013.01); *G05D 1/0285* (2013.01); *G06Q 10/1097* (2013.01); *G05D 2201/0212* (2013.01); *G05D 2201/0213* (2013.01); *G06Q 30/0633* (2013.01)

(58) Field of Classification Search
CPC ............. G06Q 10/083; G06Q 10/0832; G06Q 10/0836; G06Q 10/1097; G06Q 30/0633; G07F 17/12; B65G 1/04; G05D 2201/0212; G05D 1/0276; G05D 1/0278; G05D 1/0285; G05D 2201/0213
See application file for complete search history.

(56) References Cited

U.S. PATENT DOCUMENTS

| | | | |
|---|---|---|---|
| 6,933,832 B1* | 8/2005 | Simms | G07F 17/12 340/5.73 |
| 9,552,564 B1* | 1/2017 | Martenis | G06Q 10/083 |
| 9,733,646 B1* | 8/2017 | Nusser | B65G 1/137 |
| 2014/0136414 A1* | 5/2014 | Abhyanker | G06Q 50/28 705/44 |
| 2015/0006005 A1* | 1/2015 | Yu | G06Q 50/28 701/22 |
| 2015/0321595 A1* | 11/2015 | Hempsch | B60P 1/6418 414/812 |

(Continued)

OTHER PUBLICATIONS

R. Mileham, "Prime movers [Transport Drones]," in Engineering & Technology, vol. 11, No. 4, pp. 70-72, May 2016, doi: 10.1049/et.2016.0408. (Year: 2016).*

*Primary Examiner* — Michael P Harrington
*Assistant Examiner* — Brian A Tallman
(74) *Attorney, Agent, or Firm* — Oliff PLC

(57) ABSTRACT

An improved method for the delivery of an ordered item to a locked storage containers comprising determining the availability of the container to receive a delivery; identifying a time interval during which the delivery can be made; sending a signal to the storage container allowing access by a delivery agent, the improvement wherein delivery is achieved with a robotic positioner and a driverless vehicle.

8 Claims, 10 Drawing Sheets

(56) References Cited

U.S. PATENT DOCUMENTS

| | | | |
|---|---|---|---|
| 2016/0026967 A1* | 1/2016 | Shah | G06Q 10/08 |
| | | | 701/28 |
| 2016/0235236 A1* | 8/2016 | Byers | A47G 29/14 |
| 2016/0364989 A1* | 12/2016 | Speasl | B64C 39/024 |
| 2017/0123421 A1* | 5/2017 | Kentley | G01S 17/87 |
| 2017/0147975 A1* | 5/2017 | Natarajan | B64C 39/024 |
| 2018/0024554 A1* | 1/2018 | Brady | G06T 7/20 |
| | | | 701/23 |
| 2019/0113935 A1* | 4/2019 | Kuo | G05D 1/0276 |

* cited by examiner

RECEIVE, VIA PROCESSOR, AN ORDER FOR GOODS, THE ORDER DIRECTING DELIVERY TO BUYER AND ITINERARY INFORMATION
202

TRANSMIT ORDER TO ROBOTIC POSITIONER
204

ROBOT POSITIONS GOODS IN DRIVERLESS VEHICLE
206

DRIVERLESS VEHICLE DELIVERS GOODS TO STORAGE CONTAINER, FOLLOWING ITINERARY INFORMATION
208

FIG. 9

SYSTEM AND METHOD FOR ROBOTIC DELIVERY

CROSS REFERENCE TO RELATED APPLICATION

This application claims the benefit of Provisional U.S. Patent Application No. 62/382,926, filed Sep. 2, 2016, the entire contents and disclosure of which, both express and implied, are incorporated herein by reference.

BACKGROUND OF INVENTION

The recent upsurge in e-commerce whereby a consumer accesses a website over the Internet to purchase goods for delivery to the home, office or other site has created a need for secure systems/methods for scheduling and tracking deliveries of the purchased items, as well as for providing a safe and secure site for receipt of the goods when they are delivered to an unoccupied site. The convenience of being able to avoid making trips to a brick and mortar store or outlet to purchase goods, and having the goods delivered to home, office or other site is off-set by the problems surrounding the secure delivery of the goods to the purchaser. If the purchaser is not available on-site to receive the goods, delivery must either be re-scheduled or the goods must be left unsecured at the site, thereby being subject to theft or damage.

U.S. Pat. No. 6,933,832, the entire contents and disclosure of which are incorporated by reference herein, describes a system and method which enables the delivery, and safe and secure receipt of purchased items or other goods, at an unattended site.

The patented method and system enables the delivery of at least one purchased or ordered item to a locked storage container, associated with a corresponding customer, the method comprising, following the purchase or order of the at least one item, determining the availability of the locked storage container to receive the delivery at one or more times, identifying a time interval during which the delivery can be made, and sending to the locked storage container an access signal allowing a delivery agent access to the locked storage container only during the time interval for delivery thereto of the at least one item.

Copending patent application Ser. No. 14/544,035, filed Feb. 2, 2015, describes an improvement in the patented system wherein the delivery agent is a drone aircraft.

SUMMARY OF THE INVENTION

The present invention relates to a still further improvement in the patented system wherein delivery is accomplished robotically and with a driverless vehicle.

DESCRIPTION OF THE DRAWINGS

FIG. 9 illustrates is a flow chart illustrating a method for automated, robotic delivery, in accordance to certain example embodiments.

DETAILED DESCRIPTION OF THE INVENTION

Figure 1:
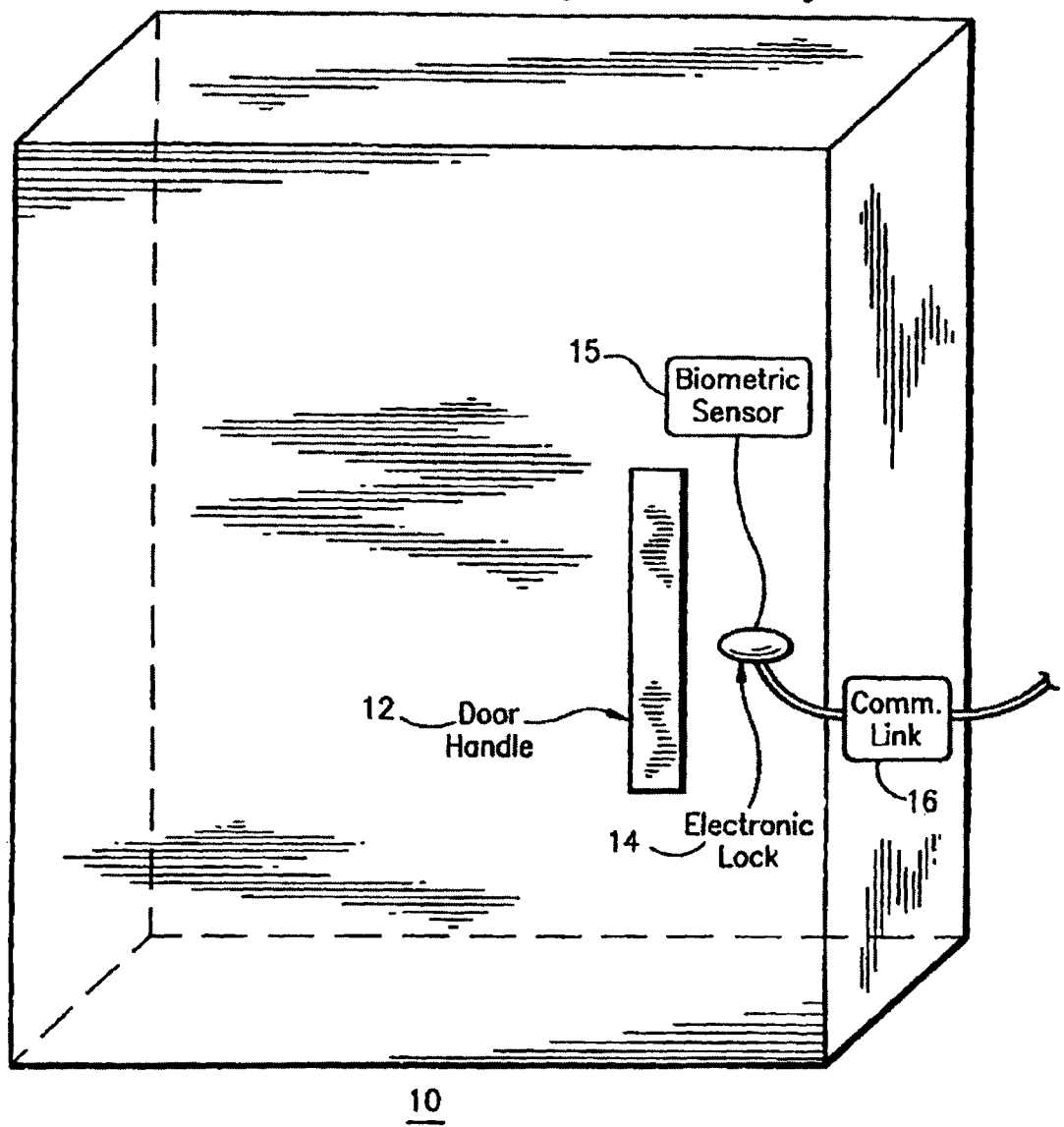
FIG. 1 is an elevational view of a storage container.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention is predicated on the unexpected discovery that the method for the delivery of at least one purchased or ordered item to a locked storage container, associated with a corresponding customer, the method comprising, following the purchase or order of the at least one item, determining the availability of the locked storage container to receive the delivery at one or more times, identifying a time interval during which the delivery can be made, sending to the locked storage container an access signal allowing a delivery agent access to the locked storage container only during the time interval for delivery thereto of the at least one item can be vastly improved where delivery to the locked storage container comprises a system and method for robotic delivery with a driverless vehicle.

The method of the invention is predicated on the provision of a system and method which include and comprise a processing device capable of (1) receiving a purchase order of at least one element (goods) from a client/customer/buyer, (2) computing itinerary information to the locked storage containers, which are accessible by means of an identifier which unlocks an entry door to the interior of the locked storage container, (3) transmitting the purchase order to a robotic positioner, which is capable of placing the ordered goods into a driverless vehicle, and (4) transmitting the order and itinerary information to the driverless vehicle, which is capable of conveying the ordered goods to the locked storage containers, unlocking the storage containers, robotically depositing the ordered goods into the storage containers, and relocking the storage containers.

The improvement of the patented system and method by utilizing the driverless vehicle and robotic delivery system of the present invention provides many significant advantages.

In the United States alone, more than 30,000 people die in traffic-related deaths every year, whereas driverless delivery vehicles would drastically reduce the number of accidents helping to save thousands of lives. Moreover, driverless vehicles have a great potential in efficiency in terms of better traffic flow, and also less fuel consumption. They will also reduce carbon emissions by as much as 300 million tons per year.

The driverless vehicle may take many forms, including those powered by an internal combustion engine, electric engine or hybrid thereof. The vehicle may be a cargo van, minivan, pickup truck, panel van, platform truck, flatbed truck, refrigerated truck, tank truck, semi-trailer truck, or automobile. It will be understood by those skilled in the art that any conventional driverless platform may be utilized in the delivery vehicle for the practice of the present invention, such as, for example, the Google® car.

Preferably, the driverless vehicle is equipped with a Global Positioning System to provide location data associated with a location of the driverless vehicle. The location data may be processed based on the itinerary information transmitted thereto by the processor and, based on the comparison, instructions on travel distance and travel direction associated with a destination may be adjusted.

The driverless vehicle is preferably equipped with the robotic positioner; however, those skilled in the art will appreciate that the invention includes an embodiment wherein the origin of the ordered goods and the destination storage container(s) are also equipped with their own robotic positioner The driverless vehicle may receive the itinerary information from the processor and/or robotic positioner. To store the itinerary information, the driverless vehicle may include a memory unit. The memory unit may include an external hard drive, CD, DVD, and so forth. Additionally, the driverless vehicle may include its own processor to execute itinerary instructions.

The robotic positioner may be equipped with one or more arms configured to grasp the goods and place the goods on or in the driverless vehicle. The robot may be configured to pour an ordered amount of the goods into the driverless vehicle. In other embodiments, the robot may include a conveyor configured to move goods into the driverless vehicle.

The method of the invention is predicated on the provision of at least one locked storage container which is accessible by means of an identifier which unlocks an entry door to the interior of the locked storage container.

It will be understood by those skilled in the art that an "identifier" includes a physical device, such as a key, electronic key, smart card, magnetic card, or similar device carried or transported by a delivery agent; a biometric property such as fingerprint, voice recognition, retinal scan of a delivery person; wireless communication options such as any duplex, half-duplex, or full-duplex communication method including but not limited to: Near Field Communications (NFC), WiFi, Bluetooth, Radio, RFID, Mesh Networking Protocols (i.e. FabFi, G.hn, etc.), Ethernet, Telephone, Fiber Optic, Optical, Barcode, QR Code, or any combination of methods, or any other element which operates to unlock the appliance, locker or device upon being sensed and identified by the latter.

According to the improved method of the invention, identification may be supplied by the driverless delivery vehicle. A typical location for the locked storage container is near or affixed to the exterior of a home or office. The locked storage container is capable of receiving and storing goods for delivery or pickup with a level of security preventing unauthorized entry or theft and with protection against pests and unfavorable weather conditions. The locked storage container may be equipped with multiple storage areas, some of which may be cooled or heated. The container may be free-standing, secured to a fixed location or affixed to a structure.

The locked storage container is preferably in electronic communication with a computer or computer network by any of a variety of means, including, but not limited to a telephonic signal, television cable, computer network cable, radio signal or the like.

The locked storage container receives and transmits data to the computer or computer network via a "scheduler" which is capable of organizing and recording a schedule of deliveries and pickups utilizing the appliance, locker or device and transmitting instructions to the appliance allowing it to identify an identifier authorized to access the appliance in accordance with a schedule. The locked storage container is preferably identifiable by the computer or computer network with which it is communicating by identification number, name or location. Each locked storage container is also preferably associated with a particular customer's account records.

Still another embodiment of the invention comprises a method and system of scheduling and tracking deliveries, of receiving deliveries utilizing a specialized device, of making and processing payment, of inventorying items scheduled for delivery and items delivered and of making information about deliveries available through a variety of means. Users of the method and system may be entities desiring to make deliveries and/or to receive deliveries. Users of the method and system may schedule delivery, track shipment and delivery, make secure delivery via a specialized appliance, locker or device, make and confirm payment, inventory items scheduled for delivery and delivered. Users of the method and system may access data regarding the appliance, device or locker and/or delivery location stored on the computer or computer network and accessed by a variety of means including telephone, radio, computer network or the Internet. The type of data which may be accessed includes, but is not limited to, data concerning the location of the locked storage container and alternative delivery locations, the capacity and type of storage of the appliance, the type and availability of storage capacity at the time and date of intended delivery and special instructions or other information pertaining to the delivery appliance and location and method of payment.

The present invention may alternately be described as a method or system of a driverless vehicle delivery to one of a plurality of locked storage containers, each associated with a corresponding customer, using a delivery system including a scheduler, the steps including: ordering a first delivery of one or more goods for a first customer associated with a first locked storage container of the plurality of locked storage containers; following the ordering of the first delivery, determining the availability of the first locked storage container to receive the first delivery at one or more times by use of the scheduler; identifying, using the scheduler, a first time interval during which the first delivery can be made; and the delivery system sending to the first locked storage container an access signal allowing a first driverless delivery vehicle to access the first locked storage container only during the first time interval. The steps include: ordering a second delivery of one or more goods for the first customer; following the ordering of the second delivery, determining the availability of the first locked storage container to receive the second delivery at one or more times by use of the scheduler; identifying, using the scheduler, a second time interval during which the second delivery can be made; and the delivery system sending to the first locked storage container an access signal allowing a second driverless delivery vehicle to access the first locked storage container only during the second time interval.

A delivery can be ordered for one or more goods for a second customer associated with a second locked storage container of the plurality of locked storage containers. Following the ordering of the last-mentioned delivery, the availability of the second locked storage container to receive the last-mentioned delivery at one or more times by use of the schedule is determined. The method identifies, using the scheduler, a second customer time interval during which the last-mentioned delivery can be made; and the delivery system sends to the second locked storage container an access signal allowing a driverless vehicle which is delivering the last-mentioned delivery to access the second locked storage container only during the second customer time interval. The first driverless vehicle opens the first locked storage container using an identifier corresponding to the first driverless vehicle and the second driverless vehicle opens the first locked storage container using an identifier corresponding to the second driverless delivery vehicle.

Following the ordering, the size of the delivery is determined using the delivery system. Available room within the first locked storage container is checked by use of the delivery system. Upon availability as indicated by the checking step, the delivery system reserves sufficient room within the first locked storage container to receive the delivery.

Following the first delivery, an account of the first customer is charged for the first delivery to the first locked storage container signaling the delivery system of the insertion of the first delivery into the first locked storage container. The first locked storage container signals the delivery system of the insertion of the first delivery into the first locked storage container based on access by the first driverless delivery vehicle.

The invention may alternately be described as a method and system of delivery of ordered items to a plurality of locked storage containers by driverless delivery vehicles using a delivery system, the steps including: ordering a delivery of one or more goods to a first customer; following the ordering, determining the size of the delivery using the delivery system; checking available room within a first locked storage container of the plurality of locked storage containers, the first locked storage container corresponding to the first customer, by use of the delivery system; upon availability, reserving, by operation of the delivery system, sufficient room within the first locked storage container to receive the delivery; and delivering the delivery to within the first locked storage container. Upon finding that the available room within the first locked storage container is insufficient for the size of the delivery, the ordered delivery is divided into at least first and second partial deliveries for separate delivery upon there being available room. The delivery system includes a scheduler and the method further includes the steps of: following the ordering of the delivery, determining the availability of the first locked storage container to receive the first and parts at one or more times by use of the scheduler; identifying, using the scheduler, a first time interval during which the first partial delivery can be made and a second time interval during which the second partial delivery can be made; and the delivery system sending to the first locked storage container an access signal allowing access to the first locked storage container only during the first time interval for delivery of the first partial delivery and during the second time interval for delivery of the second partial delivery. Prior to dividing the ordered delivery, input is received from the customer indicating the customer's preference for a complete delivery or delivery in multiple portions; and the scheduler schedules delivery according to the customer's preference. The method of further includes the step of: charging an account of the first customer for a delivery upon the locked storage container signaling the delivery system of the insertion of a delivery into the locked storage container.

The invention may alternately be described as a method for delivery of ordered items to a plurality of locked storage containers by driverless delivery vehicles using a delivery system, the steps including: ordering a delivery of one or more goods to a customer; delivering the delivery to within one of the locked storage containers corresponding to the customer; and automatically sending a DELIVERY MADE signal from the one of the locked storage containers signaling the delivery system of the insertion of the delivery into the one of the locked storage containers. Upon the delivery system receiving the DELIVERY MADE signal, the delivery system performs one or more steps selected from the group consisting of: charging an account of the customer for the delivery; and automatically initiating a communication to the customer. The delivery system includes a scheduler and further includes the steps of: following the ordering, determining the availability of the one of the locked storage containers to receive the delivery at one or more times by use of the scheduler; identifying, using the scheduler, a first time interval during which the delivery can be made; and the delivery system sending to the one of the locked storage containers an access signal allowing a first driverless delivery vehicle to access one of the locked storage containers only during the first time interval. The method further includes the steps of: following the ordering, determining the size of the delivery using the delivery system; and checking available room with the one of the locked storage containers by use of the delivery system.

The delivery system of the present invention may be described as including: at least one locked storage container corresponding to a customer, an order receiver for receiving orders for delivery by a driverless delivery vehicle of one or more goods for customer; availability determiner for determining the availability of the locked storage container to receive deliveries at one or more times; a scheduler receiving availability information from the availability determiner and operable to identify a time interval during which the delivery can be made and operable to send to a locked storage container an access signal allowing a driverless delivery vehicle that is delivering a delivery to access the locked storage container only during the time interval identified by the scheduler, wherein the storage container is equipped with an element for receiving the access signal and loading docks whereby a driverless delivery vehicle may dock therewith, access the interior of a locked storage container and robotically deliver goods thereinto.

The locked storage container of the present invention is an appliance equipped as described above with loading docks for a driverless delivery vehicle to dock therewith and securely deliver goods/items therein robotically, without requiring a person in attendance to accept delivery and which includes: a storage container; a lock controlling access to the storage container; and a communication link connected to the lock and operable to receive an access signal from a remote location to allow access to the storage container; and wherein the lock is responsive to the communication link receiving the access signal by unlocking upon presentation of an identifier such as described above.

FIG. 1 shows an appliance 10 according to the present invention. The appliance 10 is a locked storage container with a door handle 12 and an electronic lock 14. The lock 14 may be accessed by a universal key, other physical device or other identifier (including biometric properties as discussed above). The lock 14 is capable of identifying electronically or by other means the key (more generally the identifier) being used for unlocking or opening the appliance. However, in the preferred design the appliance 10 is capable of identifying specific keys authorized for entry and/or permitting access by unlocking the door based on instructions communicated to it by a scheduler, remotely located. The scheduler is connected to lock 14 via communications link 16 such as a modem or other interface to the telephone system, the internet or other communications, and discussed in more detail below. The appliance is also capable of denying entry to keys not authorized for delivery or not authorized for delivery at that time. The appliance is preferably capable of recording and/or transmitting a log or other itemized listing of authorized and unauthorized attempt(s) at opening the appliance and may include among other information the electronic identity of each key, the date and time of the attempt.

The access to appliance 10 may be explained by an example. A first driverless delivery vehicle working for a first company may have an electronic key, such as a smart card or magnetic card, unique to that vehicle. Alternately, and in lieu of the key or other physical access device, a biometric property (such as fingerprint, voice pattern, retinal pattern) of the delivery person may be read by an optional biometric sensor 15. A second driverless delivery vehicle working for a second company may have an electronic key, such as a smart card or magnetic card, unique to the second company. The first driverless delivery vehicle may be scheduled for accessing the appliance 10 during a first time interval such as between 9 AM and 12 noon on a given day, whereas the second driverless delivery vehicle may be scheduled for accessing the appliance 10 during a second time interval such as between 1 PM and 4 PM on the same day. Under such circumstances, the lock 14 could only be opened by the first driverless delivery vehicle's electronic key (not shown) during the first time interval, whereas the lock 14 could only be opened by the second driverless delivery vehicle's electronic key (not shown) during the second time interval. This assumes that the scheduler switches the lock 14 into an access state in which it is unlockable by an electronic key. Alternately, the scheduler could simply unlock the lock 14 so that a driverless delivery vehicle could insert items in the appliance without needing a lock.

The time intervals might be much longer then the several hour time intervals above. For example, a time interval of 24 or more hours for a delivery might be used. Further, the first and second time intervals might overlap or even be identical (i.e., two deliveries scheduled for the same time interval).

Figure 2:
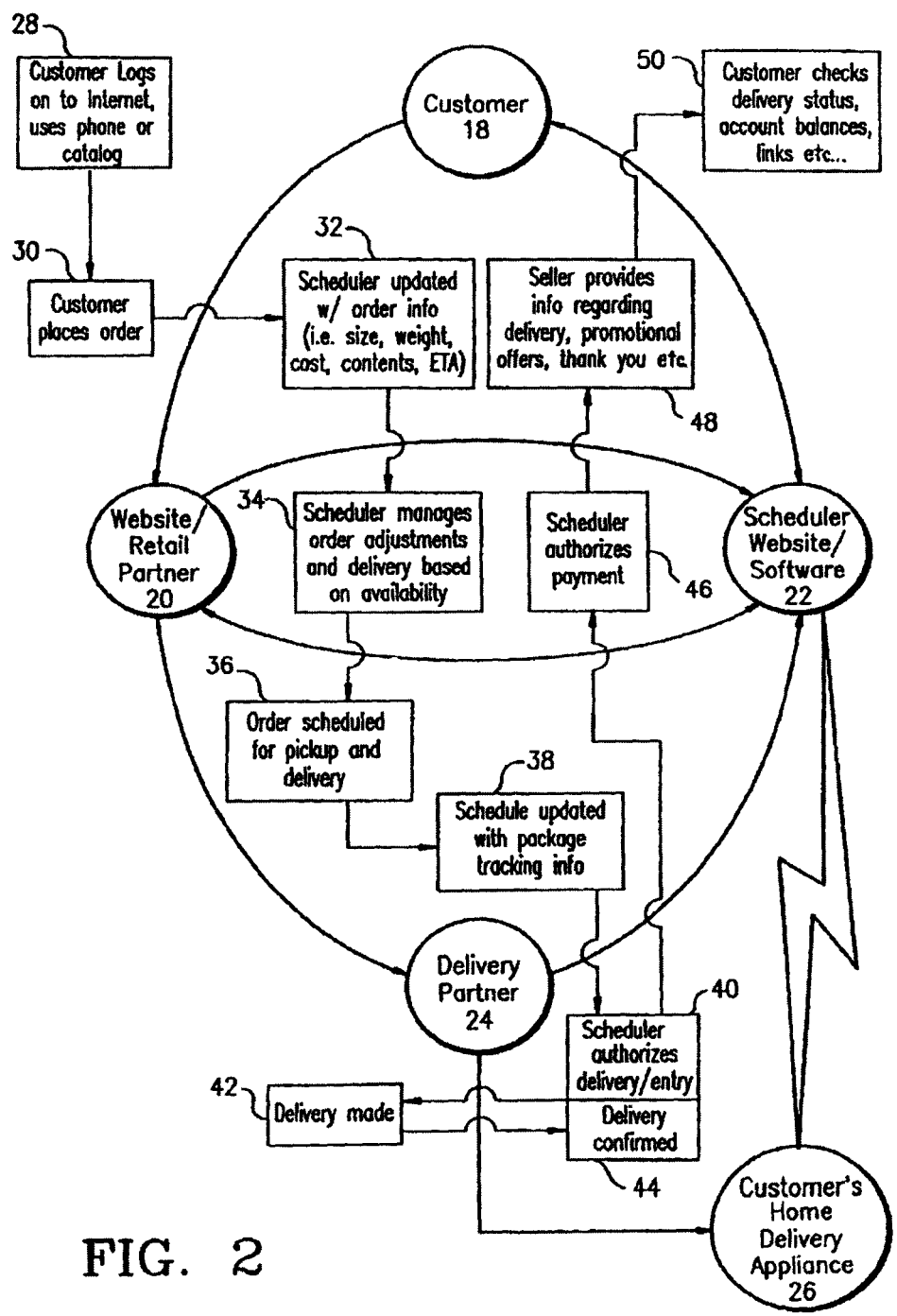
FIG. 2 is a flow sheet depicting the steps of the method of the invention overlaid on the main components or participants in the method.
Figure 3:
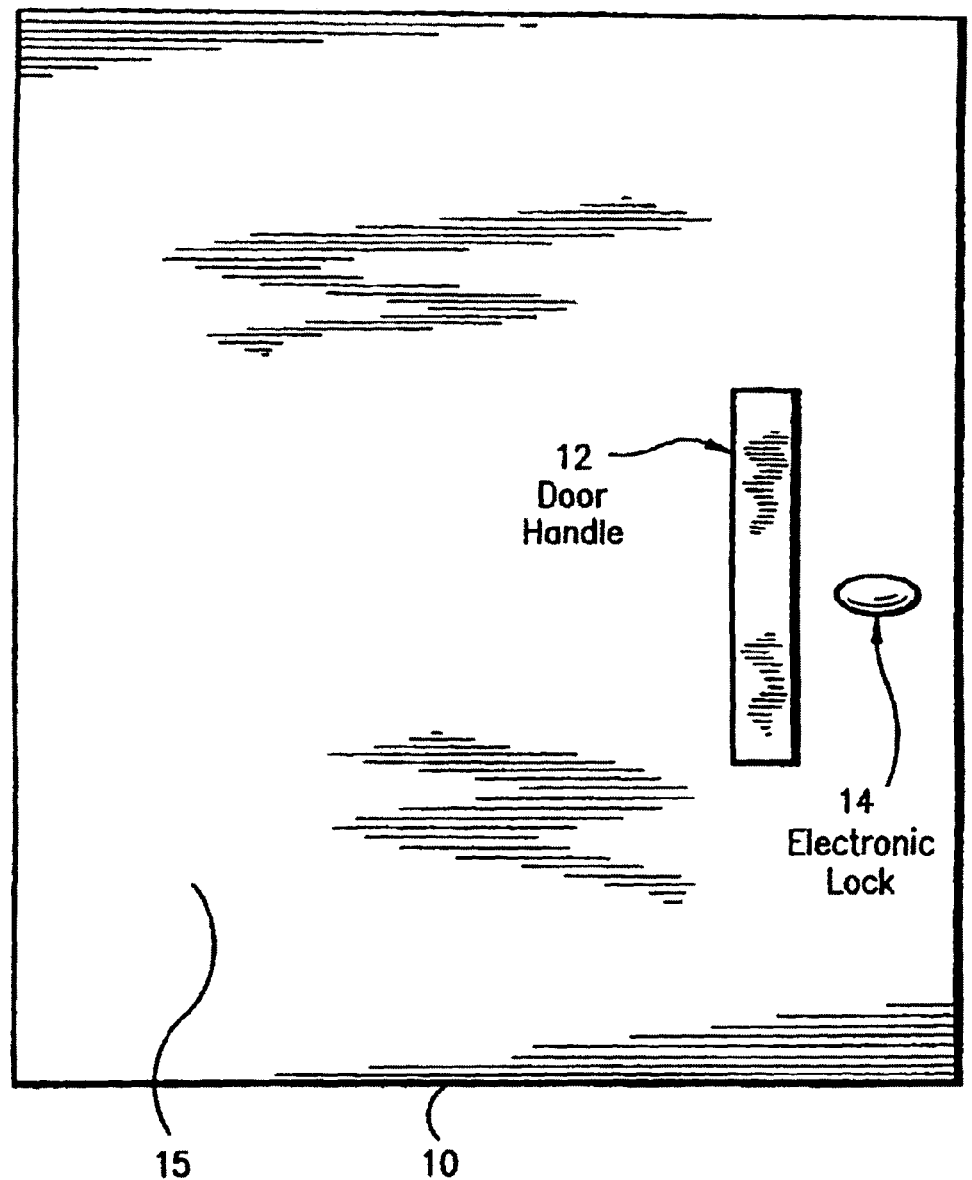
FIG. 3 is an elevational view of the front of a storage container.
Figure 4:
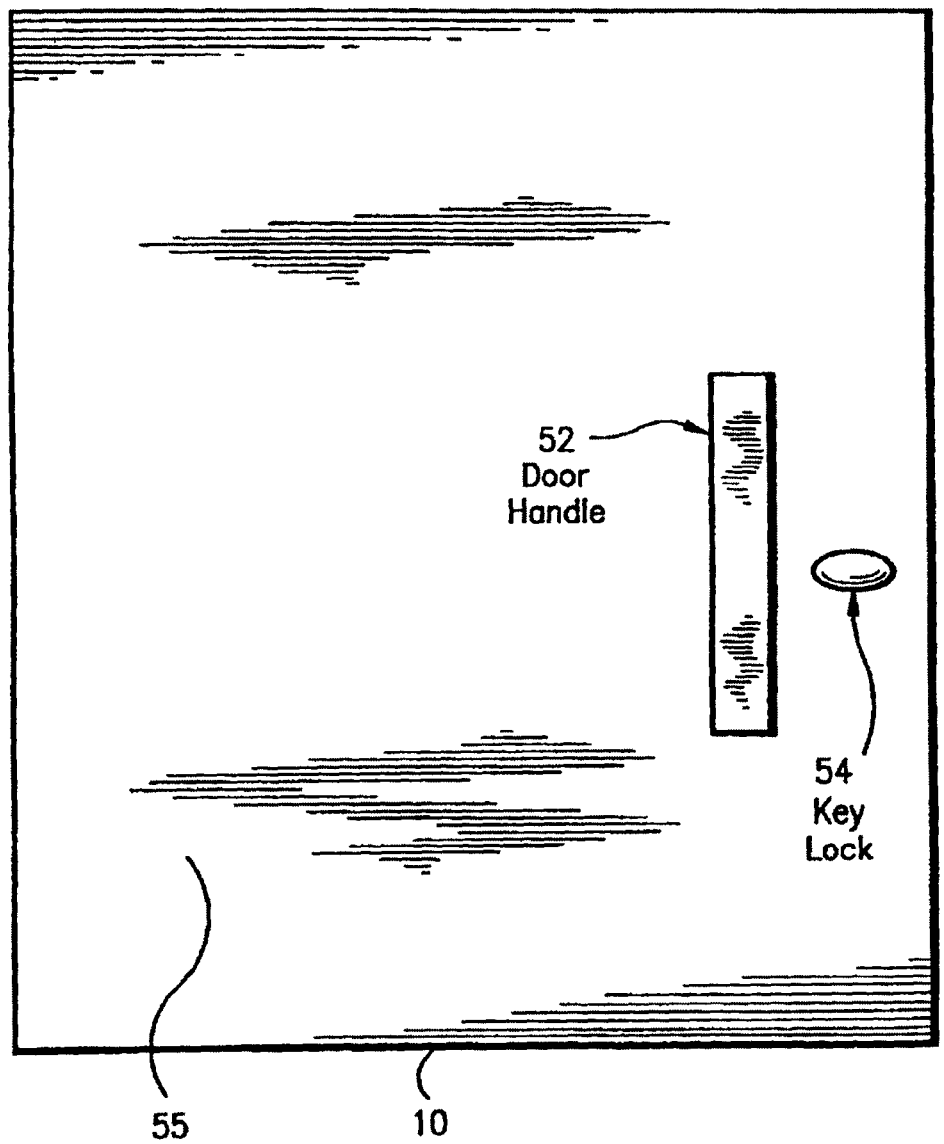
FIG. 4 is an elevational view of the rear of a storage container.
Figure 5:
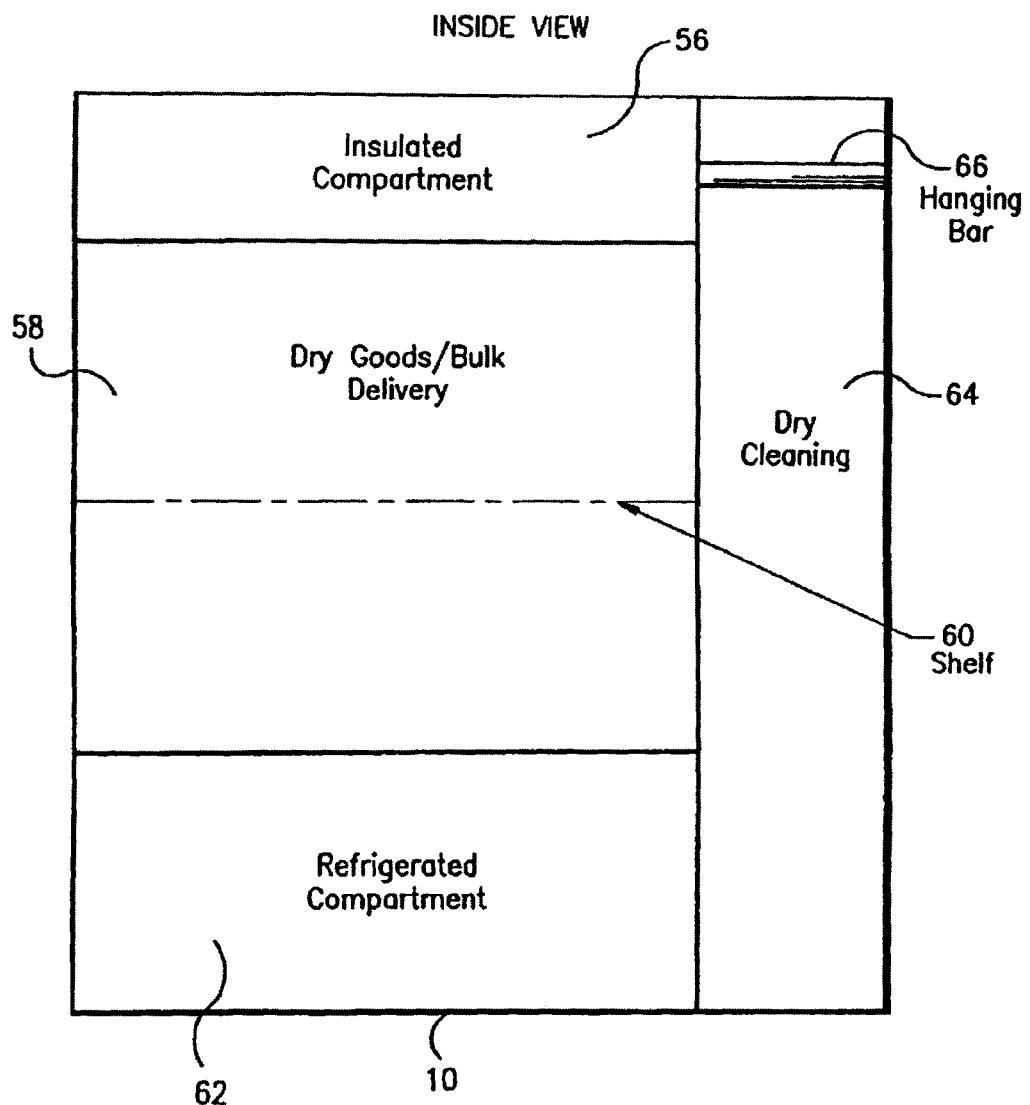
FIG. 5 is a cut-away view of the interior of a storage container.

In a typical use of the device, system and method of the invention, and with particular reference to FIG. 2, a flow chart is shown overlaid on the main components or participants linked as shown. Discussing first, the main components or participants, the customer 18 is linked to website/retail partner 20 which in turn is linked to a scheduler website software 22 and delivery partner 24. The delivery partner 24 in turn is linked to website/retail partner 20 and also to the customer's home delivery attendant 26. The various illustrated links between 18, 20, 22, 24, and 26 would preferably be internet links, but telephone or other links could also be used for some or all of the links. It should be understood that the components 18 through 26 are shown for a particular customer, but in practice there would be a plurality of customers 18 each having an associated home delivery attendant 26. Additionally, the scheduler website/software may interact with a plurality of retail outlets 20 and a plurality of delivery partners 24. For example, there may be a retailer 20 for books, a different retailer 20 for clothing, and numerous other retailers, some competitive with others, all linked to the scheduler 22. The various delivery partners may be specialized on a geographic basis, a delivery basis (i.e., one delivers within one day, another delivers within three days, etc.), and possibly by the type of delivery being made. As will be discussed below, some orders may involve goods requiring special handling such as refrigeration in transit and the delivery partner delivering such goods may need a refrigerator section in a delivery truck.

Turning now to the flow chart part of FIG. 2, the steps are numbered 28 to 50, steps 40 and 44 being within a common box. At box 28, a consumer accesses an e-commerce website over the Internet to purchase goods for home delivery. The consumer identifies himself/herself as an account holder. The retailer/vendor 20 electronically looks up and verifies the account of the consumer against a register or database of accounts made available on-line by the scheduler 22. An account holder is an authorized user of an appliance(s) 10 (FIG. 1 only) capable of unattended receipt/delivery and of electronically communicating with a specialized computer program (scheduler) which schedules deliveries to the appliance and reports deliveries to the account holder. The consumer selects items for purchase and delivery and fills an electronic shopping cart.

It will be understood that the invention also contemplates delivery of items ordered by telephone, mail, or in person at a retail store. The invention also may be used for receiving items that do not involve a commercial transaction. For example, a neighbor could return a borrowed item to the person owning the storage container.

As the shopping cart is loaded with goods selected, the estimated total size of the bundle of items as measured by the dimensions of height, width and depth is calculated (with software provided by the scheduler) based on information provided by the seller. Accessing information (provided by the scheduler over a computer network of the Internet) regarding the type and capacity of the appliance and the estimated remaining capacity of the appliance at the projected time/date of delivery, the estimated size of the bundle of items is compared against the total volume (including the various dimensions) of space remaining available in the consumer's designated appliance(s) on the time/date of the proposed date of delivery. Thus, an order that has a length of 5 feet will require 5 feet available within the appliance 10. If the volume or any dimension of the order exceeds available capacity, the consumer is given the option of splitting the delivery into two or more deliveries, of rescheduling the delivery for another time when capacity is available, or of removing items from the shopping cart.

The retailer or seller notifies the consumer of the final purchase price including shipping and handling. At step 30, the consumer authorizes the purchase and indicates method of payment. The consumer may arrange for payment to seller directly or by debit or credit accounts linked to the consumer's account. The seller finalizes the sale. At block 32, the seller notifies the scheduler 22 (a specialized computer program running on a delivery system computer) of the time/date of the intended delivery and the estimated size of the bundle of items. The scheduler reserves the capacity in the designated appliance for the scheduled time/date of the delivery. The seller also electronically provides to the scheduler (in format specified by the scheduler) an inventory of items purchased, itemized prices of each item purchased, itemized shipping and handling costs, and any other information permitted by the scheduler including coupon or "cents off" offers and other advertising and promotional information. This information provided by the seller may be made accessible by the scheduler to the consumer by a variety of means and formats, including computer networks, the Internet, electronic mail, telephone or printed matter.

The seller prepares the order for shipment. If any of the items are unavailable at the time that the order is being filled or if other items are added to the shipment for any reason, the estimated size of the bundle of items is adjusted. At step 34, the seller accesses information provided by the scheduler regarding the then available capacity at the time/date of delivery. If space is available, the shipment is scheduled at step 36. If space is unavailable, the shipment is adjusted interactively until available space capacity can be confirmed and reserved. At step 38, the seller electronically provides to the scheduler information to update the order, including any shipping information, routing or tracking numbers, etc., and any additional advertising or promotional information.

Preceding the time/date of each scheduled delivery, the scheduler communicates at step 40 electronic instructions to the appliance to permit entry to delivery personnel using a key which is identified by the appliance and matches a key authorized for entry for the scheduled delivery at that date/time (a time interval within an assigned date, or optionally, more than one date). If a key does not match a key authorized for entry at that time/date, entry will be denied. Once entry is gained for an authorized key, that key will be locked out until re-authorized.

When a delivery is made to the appliance 10 at step 42, the appliance communicates to the scheduler (by sending a "delivery made" signal) that the delivery was completed at step 44. Debit or credit sales at the point of delivery are processed for payment (costs of the goods and/or delivery applied to an account of the customer) at step 46. The scheduler updates the consumer's account with the time/date of receipt. The vendor selling the goods or service making the delivery may also provide information to the customer's account regarding the time/date of delivery, promotional material and other information specified above, including a "thank you" for the purchase at step 48.

The scheduler updates the consumer's account with various information regarding each purchase and scheduled delivery at step 50. The consumer may access this information through a variety of means including a computer network, an email, the Internet (i.e., checking a web page), a text message to the consumer's pager, or telephone. The consumer may review his/her account through a variety of views including available capacity by time period, committed capacity by time period, chronological list of scheduled deliveries, chronological list of scheduled deliveries by vendor, chronological list of scheduled deliveries by vendor classification (i.e., groceries, dry cleaning, etc.), deliveries made, deliveries missed, inventory of items ordered or delivered (by vendor, vendor classification, time period, etc.), inventory of items ordered but not shipped, calculation of costs (by vendor, vendor type, time period, method of payment, shipping and handling, etc.).

The consumer account holder may request to be notified at various stages of the shipping and delivery process. In addition to information, which is updated to the consumer's account and available by means previously specified, the notification may be made via electronic mail, voice or text pager, telephone, smart phone, Ipad type device or an app.

Although the discussion refers to consumers placing the orders, it will be understood that the person ordering may also be a business customer ordering supplies for a business.

Turning now to FIGS. 2-5, the appliance 10 details will be discussed. Door handle 12 and electronic lock 14 are on the front of the appliance 10 and would be used by delivery persons to access the appliance via a front door 15. Door handle 52 and key lock 54 would be used by the customer (i.e., appliance owner) to access the rear door 55 of the appliance 10. In practice, the appliance 10 may have its front door 15 on the outside of a house (not shown) with the rear door 55 on the inside of the house. In that case, the appliance would fit in an opening in the wall of the house in similar fashion to some room air conditioners. The inside of the appliance 10 includes an insulated compartment 56 where items such as hot food (pizza, etc.) may maintain their heat. Dry goods or bulk items may be placed within compartment 58 which is subdivided by a shelf 60. A refrigerated compartment 62 and dry cleaning section 64 with a bar 66 for hanging clothes are also included. Although not separately shown, a heated compartment and a freezer compartment may also be included.

Figure 6:
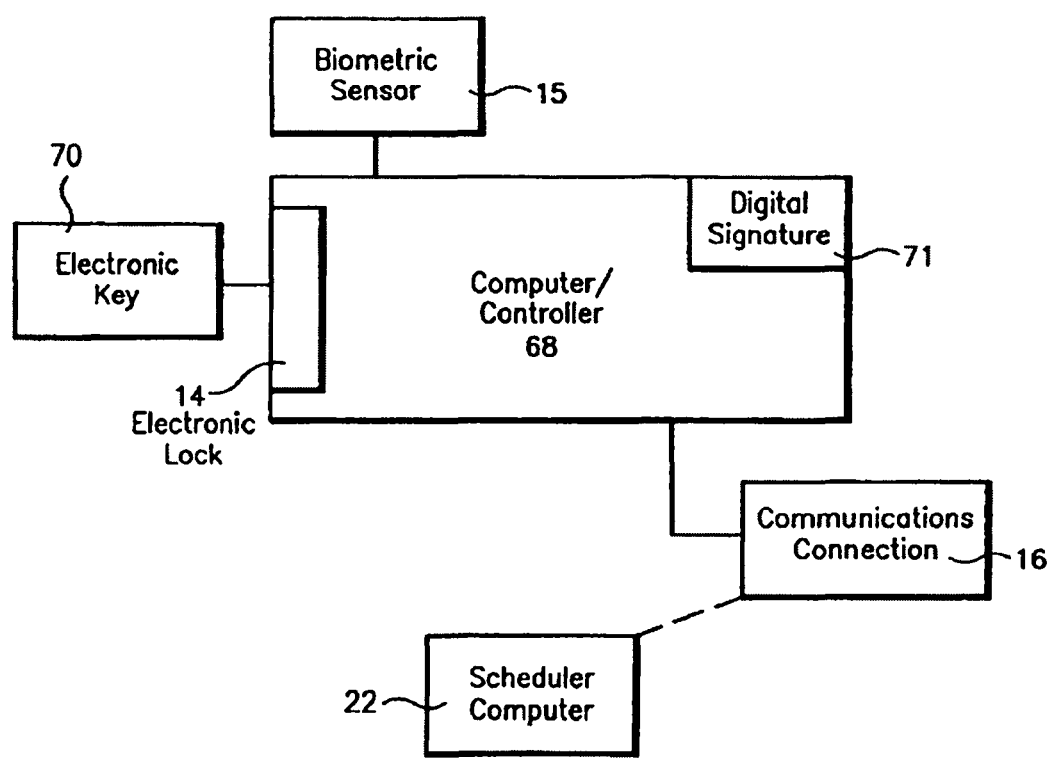
FIG. 6 is a block diagram of a system utilizing a computer as the controller between the electronic key to the storage appliance and the communications network.

Turning now to FIG. 6, the electronic lock 14 is connected to a computer/controller 68 that is in the appliance 10. The computer/controller 68, which may operate solenoids or other actuators (not shown) in order to unlock lock 14 or render it accessible (i.e., ready to be unlocked) via electronic key 70, communicates via communication link 16 with the scheduler 22. The link 16 may connect to scheduler 22 via the internet, telephone system, cable, wireless or other technique.

A digital signature 71 may be stored within computer 68 and may be used for acknowledging special deliveries. For example, the delivery of certain pharmaceutical goods may require a signature to acknowledge receipt. Upon the insertion of a pharmaceutical delivery (or any other delivery where signature is desired or required), the computer 68 may send, as part of a DELIVERY MADE signal, an appended digital signature to authenticate the delivery. Alternately, the electronic key 70 may be part of or connected to a small computer carried by the delivery person and operable to receive the digital signature acknowledging receipt of the delivery. Recent changes in the law in the United States, among other countries, may allow such digital signatures to be used in situations where written signatures were previously used.

Figure 7:
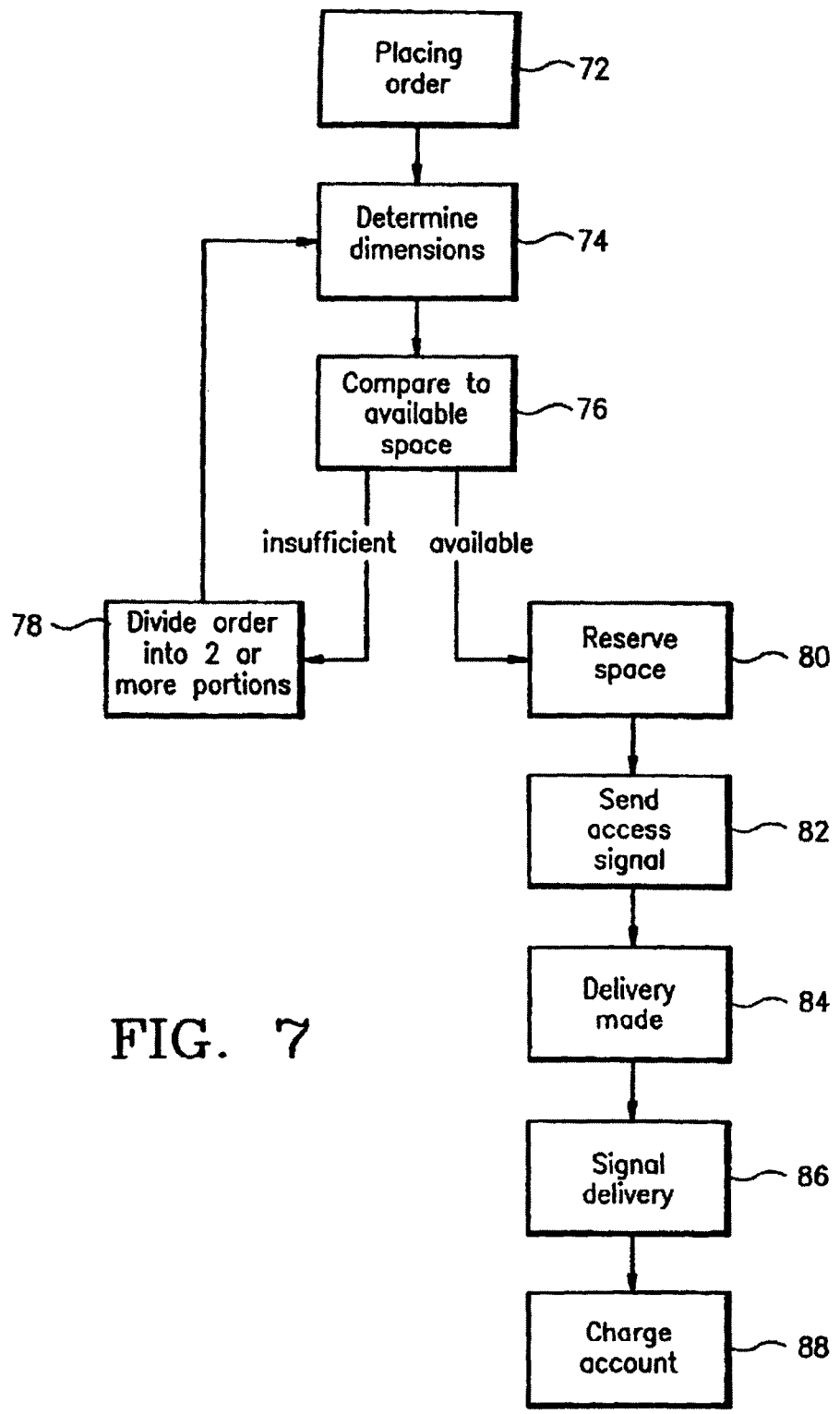
FIG. 7 is a simplified flow chart of the delivery method.

Turning now to FIG. 7, but also considering FIG. 2, a flow chart of some key aspects of the method of the present invention will be discussed. Except as otherwise noted the steps in FIG. 7 are performed by scheduler 22. The order is placed at step 72 by a customer on his/her computer which communicates it to the scheduler 22. At block 74, the scheduler 22 determines the dimensions of the order. These dimensions may have been supplied to scheduler 22 by the retailer 20. At block 76, the scheduler 22 compares the dimensions of the order with the available space within the appliance 10 for a given time period. The scheduler may keep a running total of space available within the appliance. Alternately, the computer 68 of FIG. 6 may keep a running total of space available that is supplied, upon automated request, to the scheduler.

If block 76 determines that not enough space is available, control goes to block 78 where the order is divided into two or more portions for separate delivery before returning to block 74.

Once block 76 determines that sufficient space is available, control goes to block 80 where space for the delivery is reserved. Next, block 82 sends an access signal from the scheduler 22 to the appliance 10 such that a driverless delivery vehicle may unlock it during a prescribed time interval. Block 84 indicates that the delivery is made, after which block 86 corresponds to the computer 68 of the appliance 10 sending a delivery made signal to the scheduler. Upon receipt of the signal indicating delivery, the scheduler 22 or another part of the delivery system computer on which the scheduling software runs, sends a charge account signal. The charge account signal debits or charges the customer's account for the delivery which had just been made.

Figure 8:
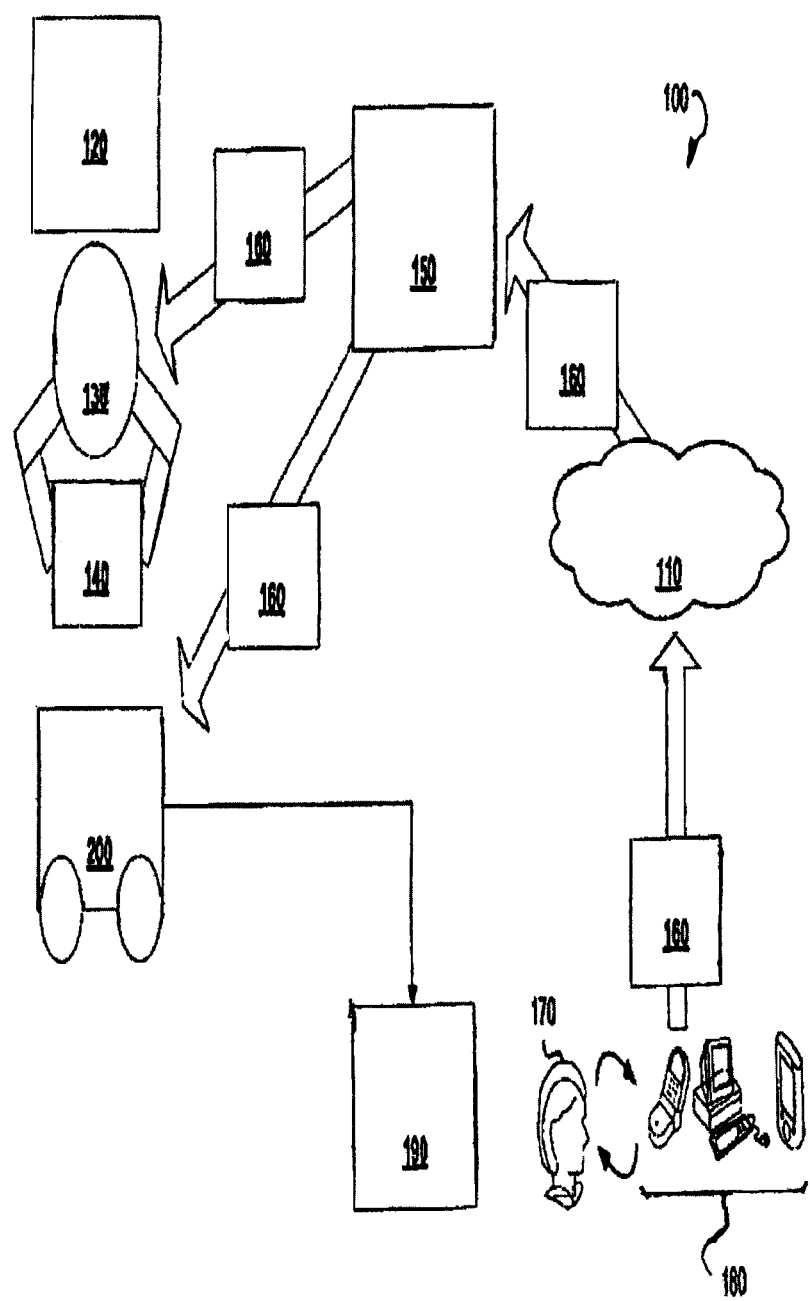
FIG. 8 illustrates an example environment for automated, robotic delivery by a driverless vehicle as well as systems and methods for automated delivery using the vehicle.

FIG. 8 illustrates an environment 100 within which a driverless delivery vehicle 200, systems and methods for automated delivery using the driverless delivery vehicle 200 can be implemented. The environment 100 may include a network 110, the driverless delivery vehicle 200, a source of goods 120, a robotic positioner 130, goods 140, a processing device 150, a buyer 170, one or more client devices 180, an order 160, and storage container 190.

The purchaser 170, using the one or more client devices 180 sends an order 160 to the processor 150. The one or more client devices 180 may include a mobile phone, a smartphone, a tablet PC, a lap top, a personal computer, and so forth. The one or more client devices 180 may communicate with the processing device 150 via the network 110 wirelessly or by wires using various connections.

The order 160 may include information on one or more goods 140 the buyer wants to be delivered to the storage containers 190 and itinerary information associated with the destination 190. The itinerary information may include instructions on travel distance and travel direction associated with destination 190. The order 160 is transmitted via network 110 to the processor 150. The processor 150 may include a server, a computing device, and so forth. The processor 150 may optionally process the order 160 to extract information to be transmitted to the robotic positioner 130 and/or the driverless delivery vehicle 200. Optionally, the processor 150 may store the order 160 to a database.

The order 160 may be transmitted to the robotic positioner 130 or driverless vehicle 200. As noted above a robotic positioner may be located in both the driverless vehicle 200 and source of goods 120 and/or destination 190. The robotic positioner 130 picks up the goods 140 based on the order 160. In another embodiment, the order 160 may be transmitted directly to the driverless vehicle 200, which may then travel to the source of goods 120 and transmit a command to a robotic positioner provided on the vehicle to deposit the goods thereon.

The driverless vehicle 200 will then transport the goods 140 to the delivery destination 190 based on the order 160 and itinerary information, such as instructions on travel distance and travel direction associated with the destination 190.

FIG. 9 illustrates is a flow chart illustrating a method 400 for automated delivery, in accordance with a preferred embodiment of the invention. Method 400 starts with a receiving, at operation 402, of an order from a purchaser. The order may specify one or more goods to be delivered to the purchaser and/or itinerary information. The order is received by a processor and transmitted by the processor to a robotic positioner and a driverless delivery vehicle at operation 404.

At operation 406, the robotic positioner places the goods on or in the driverless delivery vehicle. The driverless delivery vehicle then transports the goods to the locked storage containers at operation 408, using the itinerary information transmitted thereto by the processor.

Figure 10:
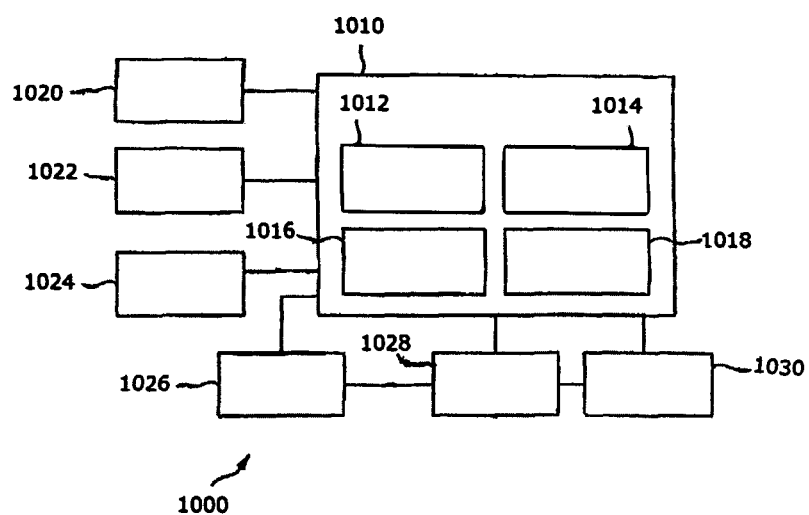
FIG. 10 is a block diagram depicting a system, in accordance with certain example embodiments.

FIG. 10 illustrates a preferred command system 1000 for directing the robotic positioning of the ordered goods (OG) on the driverless delivery vehicle (DDV), directing the DDV to the location of the locked storage containers (LSC) and directing the robotic transfer of the OG to the LSC, depicted in FIG. 10, is controlled by computer 1010, which may include elements such as an imaging regulator 1012, a tracking regulator 1014, a robotic tool regulator 1016, and an overall system regulator 1018. The computer 1010 may, of course, comprise CPU's dedicated for each operation or group of operations, or an individual CPU which handles all of the operations within a centralized control system.

Preferably connected to the computer 1010 are an electronic display 1022, a user interaction element 1024 (an interface device; e.g., a keyboard, a mouse, a touchpad, a motion gesture sensor, a microphone for voice recognition, or an imaging device) and a memory 1020. The supporting software is stored in the memory 1020 and is run by the computer 1010. The robotic positioning and transfer tool 1030 is also connected to the computer 1010 for receiving movement command signals. Also connected to and communicating with the computer 1010 are an imaging system 1028 and a tracking system 1026.

The imaging regulator 1012 generates virtual images of the robotic OG positioning and transfer work spaces at the location of the OG and on the DDV, respectively, and enables an operator (not shown) to manipulate the images and manually operate robotic positioning and transfer tool 1030 at any point during the delivery operation. It will be understood by those skilled in the art, however, that the robotic transfer and positioning operations may be conducted automatically by the computer 1010.

The imaging system 1028 is used to generate a digital model of the OG positioning and transfer areas and display the digital model as a virtual image on the electronic display 1022 and communicate it to the other computer controlled devices such as the robotic positioning and transfer tool 1030. The imaging system 1028 may also include cameras mounted on the tool that monitor the work areas during the various operations during the delivery process and aid in guiding the robotic tool 1030 in response to movements detected during the procedure.

The tracking system 1026 tracks the OG dynamically in real time with complete information about its location, orientation, and other physical parameters.

Those skilled in the art will recognize that any suitable robotic tool may be employed in the practice of the invention, provided that is capable of grasping, transferring and positioning OG to and from the origin of OG, the DDV and the LSC. Typically such tools comprise a guidance system and a drive subsystem therefore, an obstacle detection element, and other typical elements for controlling robotic tools. The robotic tool may be operated manually, or automatically by the computer 1010 to perform various functions, including transferring OG from the point of origin to the DDV, and from the DDV to the LSC.

The system 1000 functions like any conventional computer system, an embedded controller, a laptop, a server, a mobile device, a smartphone, a set-top box, a kiosk, a vehicular information system, one or more processors associated with a television, a customized machine, any other hardware platform, or any combination thereof. The system 1000 may be distributed for operation employing multiple computers interconnected via a data network or bus system.

The computer 1010 executes code or instructions to perform the required operations and functions described herein, address mappings, and perform any necessary calculations and generate commands required to achieve optimum deliveries. The computer 1010 monitors and controls the operation of the components of the system 1000 and may comprise any general purpose processor, processor core, multiprocessor, reconfigurable processor, microcontroller, digital signal processor (DSP), application specific integrated circuit (ASIC), graphics processing unit (GPU), field programmable gate array (FPGA), programmable logic device (PLD), controller, state machine, gated logic, discrete hardware components, any other processing unit, or any combination thereof. The computer 1010 may consist of a single processor, multiple processors, single processor core, multiple processor cores, special purpose processor cores, co-processors, or any combination thereof, and may, along with other components of the system 1000 be a virtualized computer capable of executing within one or more other computers.

The memory 1020 includes non-volatile memories, for example, read-only memory (ROM), programmable read-only memory (PROM), erasable programmable read-only memory (EPROM), flash memory, or any other device capable of storing program instructions or data with or without applied power. The memory 1020 also may include volatile memories, for example, random access memory (RAM), static random access memory (SRAM), dynamic random access memory (DRAM), and synchronous dynamic random access memory (SDRAM). Other types of RAM also may be utilized in the memory 1020. The memory 1020 operates utilizing a single memory module or multiple memory modules. The memory 1020 is depicted as part of the system 1000; however, one skilled in the art will recognize that the memory 1030 may be separate from the system 1000 without departing from the scope of the invention. It will also be appreciated that the memory 1020 may include, or operate in conjunction with, a non-volatile storage device.

The system 1000 may function in a networked environment using logical connections to one or more other systems or computers across a network. The network may include wide area networks (WAN), local area networks (LAN), intranets, the Internet, wireless access networks, wired networks, mobile networks, telephone networks, optical networks, or combinations thereof. The network may be packet switched, circuit switched, of any topology, and use any communication protocol. Communication links within the network may involve various digital or an analog communication media, for example, fiber optic cables, free-space optics, waveguides, electrical conductors, wireless links, antennas, radio-frequency communications, and the like.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. An improved method for the delivery of at least one ordered item from an origin to at least one of a plurality of locked storage containers, associated with a corresponding customer comprising:
    following the ordering of said delivery, determining the availability of said at least one locked storage container to receive said delivery at one or more times;
    identifying a time interval during which said delivery can be made to said at least one locked storage container;
    sending a signal to said at least one locked storage container allowing access by a delivery agent that is delivering said at least one ordered item to said at least one locked storage container only during said time interval, the improvement wherein delivery is effected with a robotic positioner and a driverless vehicle, said robotic positioner being associated with an imaging system that includes one or more cameras, said imaging system configured to monitor and regulate the robotic positioning of the ordered item, wherein the driverless vehicle is equipped with a robotic positioner.

2. The method of claim 1 wherein the driverless vehicle is equipped with a Global Positioning System adapted to establish an itinerary from the origin to the at last one locked storage container.

3. The method of claim 2 wherein the driverless vehicle includes a memory unit adapted to store the itinerary.

4. The method of claim 2 wherein the driverless vehicle includes a processor to execute the itinerary.

5. The method of claim 1 wherein the origin of the at least one ordered item is equipped with a robotic positioner.

6. The method of claim 1 wherein the storage container is equipped with a robotic positioner.

7. An improved method for the delivery of at least one ordered item from an origin to at least one of a plurality of locked storage containers, associated with a corresponding customer comprising:
    following the ordering of said delivery, determining the availability of said at least one locked storage container to receive said delivery at one or more times;
    identifying a time interval during which said delivery can be made to said at least one locked storage container;
    sending a signal to said at least one locked storage container allowing access by a delivery agent that is delivering said at least one ordered item to said at least one locked storage container only during said time interval, the improvement wherein delivery is effected with a robotic positioner and a driverless vehicle, said robotic positioner being associated with an imaging system that includes one or more cameras, said imaging system configured to monitor and regulate the robotic positioning of the ordered item, wherein the driverless vehicle is capable of receiving the location of and driving to the storage container.

8. An improved method for the delivery of at least one ordered item from an origin to at least one of a plurality of locked storage containers, associated with a corresponding customer comprising:
    following the ordering of said delivery, determining the availability of the said at least one locked storage container to receive said delivery at one or more times;
    identifying a time interval during which said delivery can be made to said at least one locked storage container;
    sending a signal to said at least one locked storage container allowing access by a delivery agent that is delivering said at least one ordered item to said at least one locked storage container only during said time interval, the improvement wherein delivery is effected with a robotic positioner and a driverless vehicle, said robotic positioner being associated with an imaging system that includes one or more cameras, said imaging system configured to monitor and regulate the robotic positioning of the ordered item, wherein the driverless vehicle is powered by an internal combustion engine, electric engine or hybrid thereof.

* * * * *